United States Patent [19]

Ito et al.

[11] Patent Number: 5,397,593
[45] Date of Patent: Mar. 14, 1995

[54] METHOD FOR TREATING FROZEN MEAT

[75] Inventors: Sadaaki Ito, Hachioji; Kiyoshi Takai, Tama, both of Japan

[73] Assignee: Nippon Suisan Kabushiki Kaisha, Tokyo, Japan

[21] Appl. No.: 67,614

[22] Filed: May 27, 1993

[30] Foreign Application Priority Data

May 29, 1992 [JP] Japan .................................. 4-139072
May 29, 1992 [JP] Japan .................................. 4-139199

[51] Int. Cl.$^6$ ............................................... A23L 1/31
[52] U.S. Cl. ........................................ 426/641; 62/64; 62/374; 99/534; 99/535; 426/524
[58] Field of Search ...................... 426/641, 643, 524; 99/534, 535, 536; 62/64, 374

[56] References Cited

U.S. PATENT DOCUMENTS 1,850,031  3/1932  Rayson .............................. 99/534 X

FOREIGN PATENT DOCUMENTS 694314    9/1964  Canada ................................ 426/524
61-67439  4/1986  Japan .................................. 426/524
62-14739  1/1987  Japan .................................. 426/524
1658965   6/1991  U.S.S.R. .............................. 99/535

Primary Examiner—Arthur L. Corbin
Attorney, Agent, or Firm—Wenderoth, Lind & Ponack

[57] ABSTRACT

During conveying of frozen meat, the frozen meat is immersed in a first treating liquid, e.g. salt water, to thaw and wash the meat surface, and then the frozen meat is immersed in a second treating liquid, e.g. alkali, to provide a quality maintaining treatment.

4 Claims, 7 Drawing Sheets

METHOD FOR TREATING FROZEN MEAT

BACKGROUND OF THE INVENTION

The present invention relates to a method and an apparatus for treating frozen meat such as frozen tuna.

Recently, in accordance with rearrangement or repair of distribution machinery or mechanisms of, for example, a cold chain, fresh meats or foods such as tuna, bonito, beef and pork have been widely distributed. These fresh meats or foods are likely degraded in their qualities over time, so that freezing has been widely utilized for preventing degradation of their freshness. It is required for the frozen meat to be thawed and washed with the quality of the frozen meat being maintained, and the thawing and washing treatments are generally performed by manually immersing the frozen meat into salt water having a water soluble property stored in a tank, or putting them in a container such as a cage and then immersing the cage in the tank to thaw the surface of the frozen meat. During these treatments, undesired materials or parts adhering to the surface of the frozen meat are removed by utilizing a band saw to cut off the undesired portions of the frozen meat and form a quadrilateral configuration.

However, in the conventional treating method described above, in the manualy immersing method, only a small amount of frozen meat can be treated, and much time is required to thaw the same, requiring a large amount of labor by workers and causing physical fatigue. Further, in the method utilizing the cage in which the frozen meat is immersed for thawing, the cage must be handled manually, so that only a small amount of frozen meat is treated in this method, thus providing poor treating efficiency. In view of these facts, the prior art further provides a method in which the frozen meat is continuously immersed in a tank, in which salt water is stored, by means of a conveyer. However, in this method, the frozen meat is manually placed on the conveyer, thus also providing poor treating efficiency.

SUMMARY OF THE INVENTION

An object of the present invention is to substantially eliminate defects or drawbacks encountered in the prior art described above and to provide a method and an apparatus for treating frozen meat requiring substantially no manual work to effectively provide the frozen meat to a treating unit and thaw and wash a surface of the frozen meat in a short time and such that the degree of freshness thereof is maintained.

This and other objects can be achieved according to the present invention by providing, in one aspect, a method of treating frozen meat comprising the steps of:
   placing the frozen meat from a supply unit on a conveyer, such as net conveyer, provided with a belt member having a number of holes;
   conveying the frozen meat to a first treating tank in which a first treating liquid is stored;
   immersing the frozen meat during the conveying thereof into the first treating liquid to thaw and wash a surface of the frozen meat;
   conveying the frozen meat to a second treating tank which is disposed downstream of the first treating tank and in which a second treating liquid is stored;
   immersing the frozen meat during the conveying thereof into the second treating liquid to subject the frozen meat to a quality maintaining treatment; and
   conveying the frozen meat thus treated externally from a downstream end of the conveyer means.

In preferred embodiments, the first treating liquid is salt water and the second treating liquid is a pH regulation liquid. The frozen meat is washed after passing through the first treating tank. Predetermined lengths of conveyer is immersed in the first and second treating liquids during the conveying of the frozen meat.

According to another aspect of the present invention, there is provided an apparatus for treating frozen meat comprising:
   a supply unit for supplying the frozen meat;
   a conveyer for conveying the frozen meat from the supply unit; and
   a treating unit for treating the frozen meat during the conveying of the frozen meat,
   wherein the treating unit includes a first treating tank in which a first treating liquid is stored and a second treating tank which is disposed downstream of the first treating tank and in which a second treating liquid is stored, and the conveyer comprises a conveyer unit including a main conveyer element formed by a belt provided with a number of holes, predetermined lengths of the main conveyer element being immersed in the first and second treating liquids during travelling of the main conveyer element.

In a preferred embodiment, the supply unit includes a frozen meat accommodation portion of a rectangular cylindrical structure having a sectional area larger than a projected shadow area of the frozen meat to be treated, the frozen meat accommodation portion having an entrance opening through which the frozen meat is supplied and a discharge opening formed at a bottom side portion of the accommodation portion so as to discharge the frozen meat horizontally to a downstream side, a supply plate formed to be reciprocally movable to discharge the frozen meat horizontally through the discharge opening, and a driving means for reciprocally moving the supply plate in the horizontal direction.

The conveyer unit further includes a first conveyer element disposed above and in parallel to the portion of the main conveyer element to be immersed in the first treating liquid with a predetermined distance therebetween and a second conveyer element disposed above and in parallel to the portion of the main conveyer element to be immersed in the second treating liquid with a predetermined distance therebetween. A washing shower may be further disposed above the main conveyer element at a location downstream of the first treating tank, and an undesired material removing device may be further provided in association with the first and second treating tanks for removing undesired materials floating on the first and second treating liquids.

The conveyer means is lifted up for cleaning or inspecting the conveyer and the treating unit.

According to the characteristics and structure of the present invention, the frozen meat is supplied to the supply unit through the upper entrance opening of the frozen meat accommodation portion. The driving mechanism is then driven to reciprocally move the supply plate, thereby discharging the frozen meat in the accommodation portion towards the treating unit. The frozen meat fed on the conveyer provided with the belt portion having a net structure is immersed in the salt water in the first treating tank and then immersed in the pH regulation liquid in the second treating tank during the travelling of the conveyer to thaw the surface of the frozen meat, to remove undesired materials adhering to the surface of the frozen meat and to effect a surface treatment for maintaining the quality of the frozen meat.

According to this treatment of the frozen meat, substantially no manual operation is involved. The thawing of the frozen meat and the removal of the undesired materials adhering to the surface of the frozen meat can be performed only during the travelling of the conveyer through the treating unit. The structure for attaining these functions is relatively simple and compact, thus achieving economical merit. The working treatment of the frozen meat can be remarkably improved.

The supply plate is driven by the driving mechanism, and accordingly, the frozen meat is automatically fed to the conveyer in the horizontal direction from the frozen meat accommodation portion of the supply unit with substantially no manual operation.

The nature and features of the present invention will be made further clear hereunder with reference to the accompanying drawings.

DESCRIPTION OF THE PREFERRED EMBODIMENTS

One embodiment of the present invention will be described hereunder with reference to FIGS. 1 to 8.

In this embodiment, a frozen tuna 7 is a preferred example of frozen meat.

A frozen meat treating apparatus 1 according to the present invention comprises a frozen meat supply unit 2 and a frozen meat treating unit 3. The supply unit 2 includes frozen meat accommodation sections 4, a supply plate 5 and a driving mechanism 6.

Figure 6:
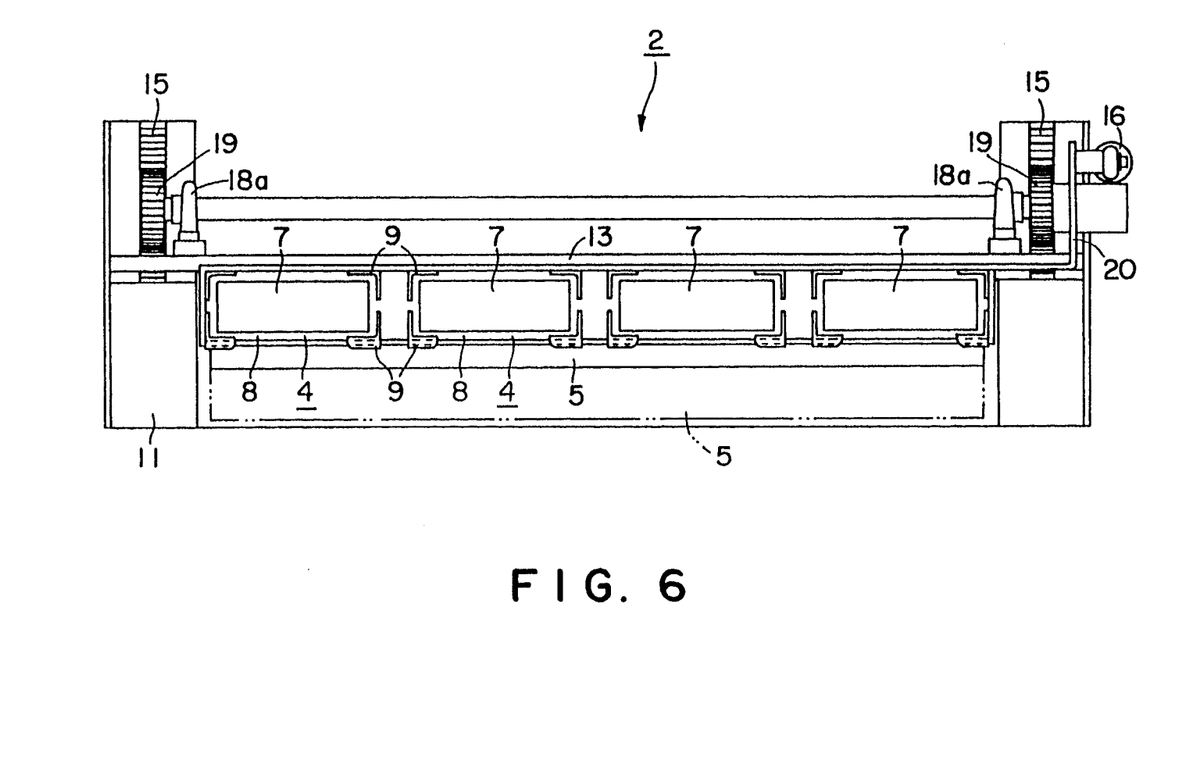
FIG. 6 is a plan view of the frozen meat supply unit of FIG. 4.

Each of the accommodation sections 4, as shown in FIG. 6, has a rectangular cylindrical structure having a cross sectional area larger than a projected shadow area of the frozen tuna 7 and is composed of a steel plate and angle members. Each of the accommodation sections 4 is formed by a plurality (four in the illustrated embodiment) of accommodation members 9 with an upper portion acting as a frozen tuna insertion port 8. These accommodation sections 4 are disposed vertically on a frame 11 having a width substantially corresponding to a width of a conveyer unit 10 of the treating unit 3. The frame 11 is mounted to a cover member 12 of the conveyer unit 10. An opening 13 is formed below the accommodation members 9 so as to cause spaces between the respective accommodation members 9 to communicate with each other, and the opening 13 has a height slightly higher than the thickness of the frozen tuna 7 and opening horizontally towards the downstream side (righthand side as viewed in FIG. 6) of the accommodation sections 4.

Figure 5:
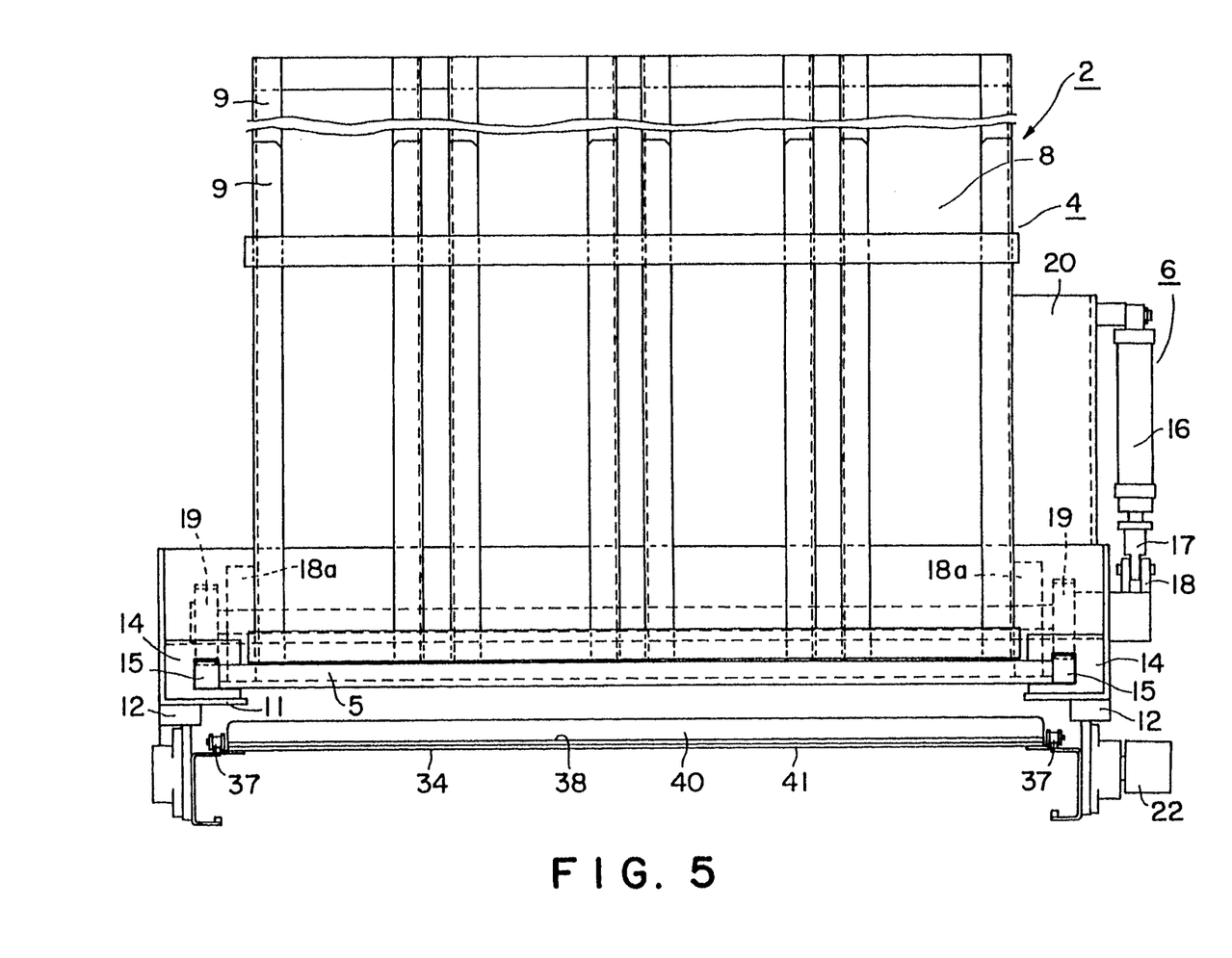
FIG. 5 is a front view of the frozen meat supply unit of FIG. 4.

Referring to FIG. 5, the supply plate 5 is composed of a plurality of steel plates, each in the shape of a short strip having a thickness slightly smaller than the height of the opening 13. The short side portions of the respective steel plates, (i.e. the right and left sides as viewed in FIG. 5) are inserted into holding members 14 made of plastic plates, for example, and each having a U-shaped section, to be reciprocally slidable in the horizontal direction. Racks 15 are fixed to side end portions of the steel plates constituting the supply plate 5.

Figure 4:
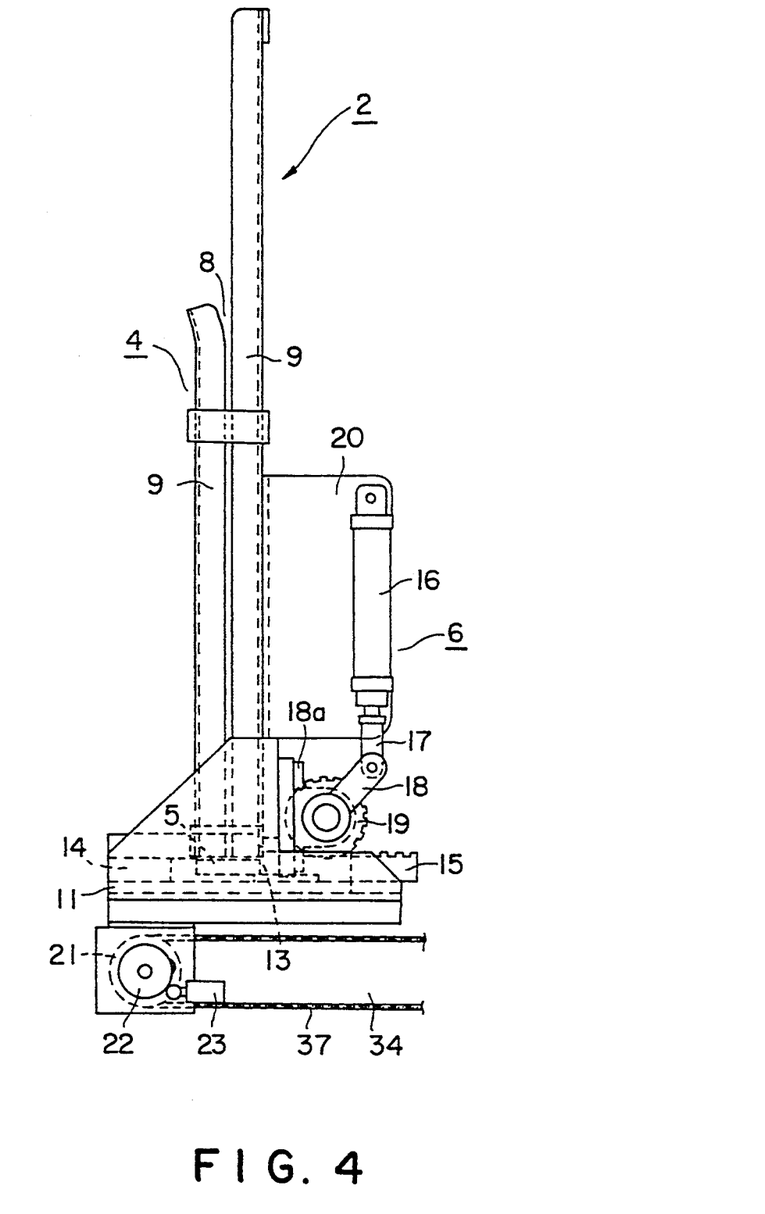
FIG. 4 is a side view of a frozen meat supply unit of the apparatus shown in FIG. 1.

The driving mechanism 6 comprises an air cylinder 16 having a piston rod 17, an arm member 18 coupled to the piston rod 17 and a pinion 19 secured to the arm member 18 and pivotally connected to a bearing 18a secured to the frame 11. As shown in FIG. 4, the air cylinder 16 is pivotally attached at its upper portion to an attachment plate 20. With this structure, when the piston rod 17 is retracted, the arm member 18 is swung and the pinion 19 is then rotated to thereby reciprocate the racks 15 secured to the support plate 5 in the horizontal direction with respect to the frame 11. The air cylinder 16 is actuated through ON-OFF operation of a limit switch 23 abutting against a cam 22 mounted on a shaft of a sprocket 21 of the treating unit 3. According to the ON-OFF operation of the limit switch 23, air is supplied to the air cylinder 16 through a change-over valve, not shown. According to this operation, the racks 15 are reciprocally moved to thereby move together with the supply plate 5 in the horizontal direction, and the frozen tuna 7 thrown in the accommodation section 4 through the entrance port 8 and placed on the upper surface of the frame 11 is discharged horizontally outward through the opening 13 on the conveyer unit 10 of the treating unit 3.

Figure 1:
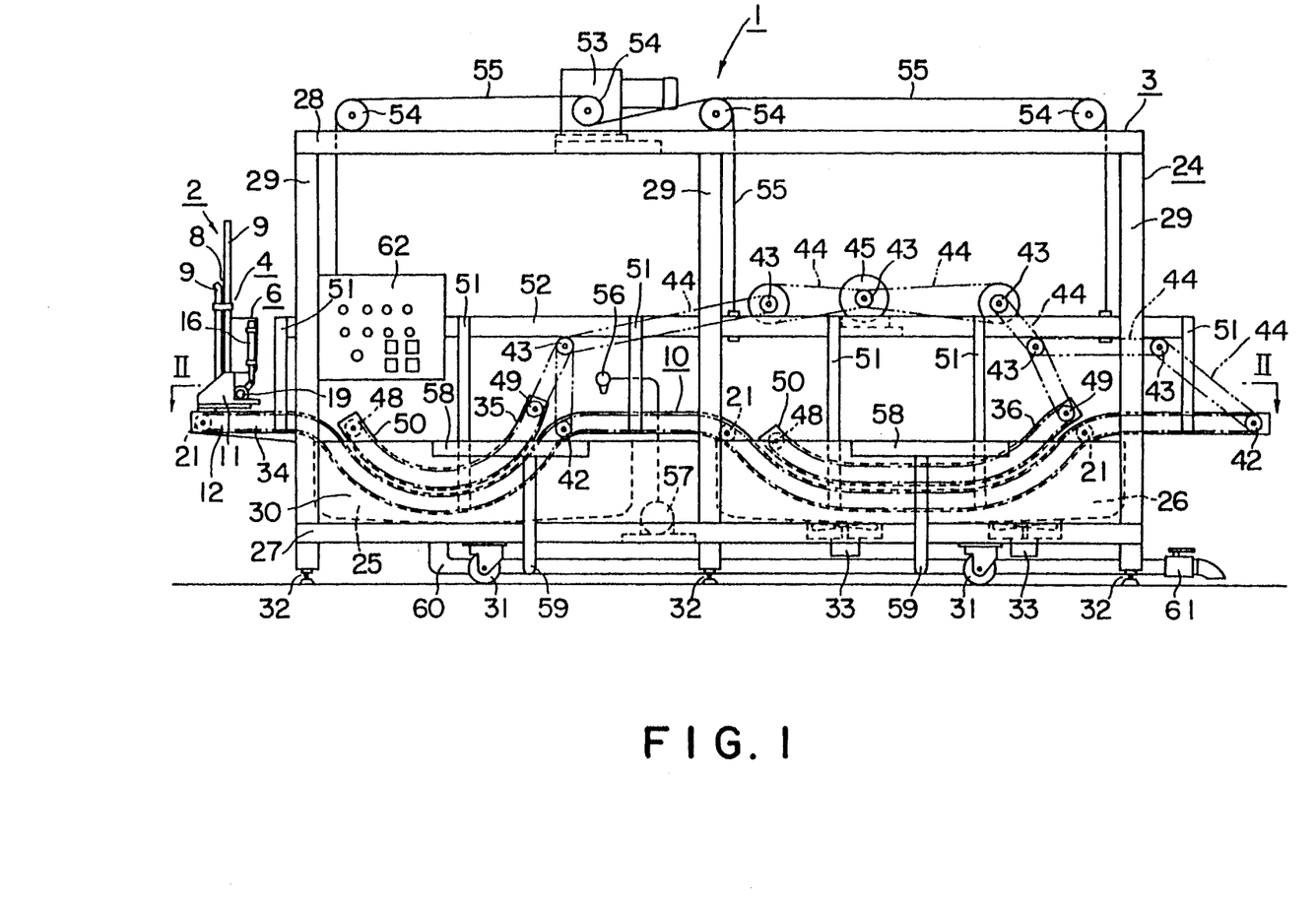
FIG. 1 is a general side view of a frozen meat treating apparatus according to the present invention.
Figure 2:
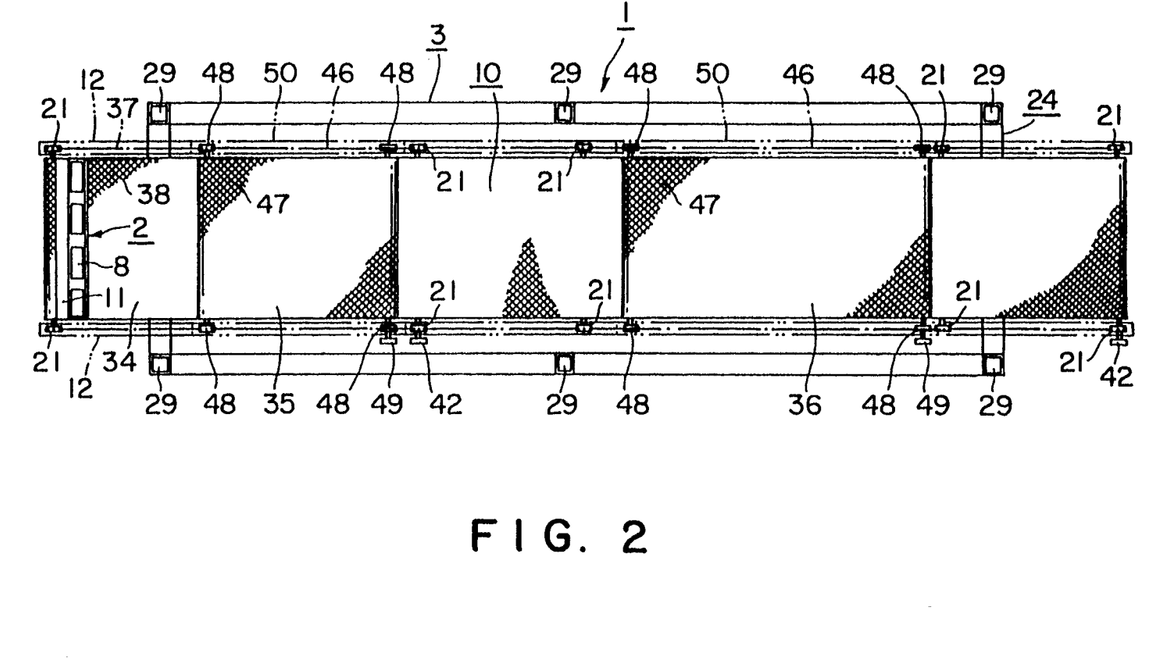
FIG. 2 is a plan view taken along the line II—II of FIG. 1.

The treating unit 3 is provided with, as shown in FIGS. 1 and 2, a support frame 24, a first treating tank 25, a second treating tank 26 and the conveyer unit 10.

The support frame 24 is composed of lower and upper frame members 27 and 28 formed by angled steel members of rectangular shape, and these lower and upper frame members 27 and 28 are secured to each other by means of column members 29, 29 to form the rectangular structure. Side plates 30 are attached to the frame members 27 and each of the side plates 30 has a height which approximately corresponds to ¼ of the vertical height of the support frame 24 as viewed in FIG. 1. Casters 31 and jacks 32 are mounted to the lower surface of the lower frame member 27 so that the treating unit can be freely moved or fixed.

The first treating tank 25 has a rectangular parallelopiped structure made of steel plates and has a longitudinal length approximately corresponding to ⅓ of the longitudinal length of the support frame 24, a width slightly narrower than that of the support frame 24 and a depth approximately corresponding to ¼ of the height of the support frame 24. The first treating tank 25 is secured to the side plate 30 (at the left side as in view of FIG. 1) on the upstream side of the support frame 24, and a first treating liquid such as salt water is stored in the first treating tank 25.

The second treating tank 26 also has a rectangular parallelepiped structure made of steel plates and has a longitudinal length approximately corresponding to ½ of the longitudinal length of the support frame 24, a width slightly narrower than that of the support frame 24 and a depth approximately corresponding to ¼ of the height of the support frame 24. The second treating tank 26 is secured to the side plate 30 (at the right side as in view of FIG. 1) on the downstream side of the support frame 24, and a second treating liquid such as a mixture of a salt water and a pH regulating liquid is stored in the second treating tank 26. Four agitators 33 provided with propellers are mounted on the bottom of the second treating tank 26.

The conveyer unit 10 comprises a main conveyer element 34 and first and second conveyer elements 35 and 36 both associated with the main conveyer element 34.

The main conveyer element 34 has a length slightly longer than the entire longitudinal length of the support frame 24 as shown in FIG. 1 and has a width slightly smaller than that of the treating tanks 25 or 26 as shown in FIG. 2. The main conveyer element 34 extends throughout the first and second treating tanks 25 and 26 and has crooked portions, which extend in a meandering manner as viewed in FIG. 1, so that the crooked portions, each having a predetermined length, are downwardly curved to be immersed in the first and second treating liquids in the first and second treating tanks 25 and 26.

Figure 3:
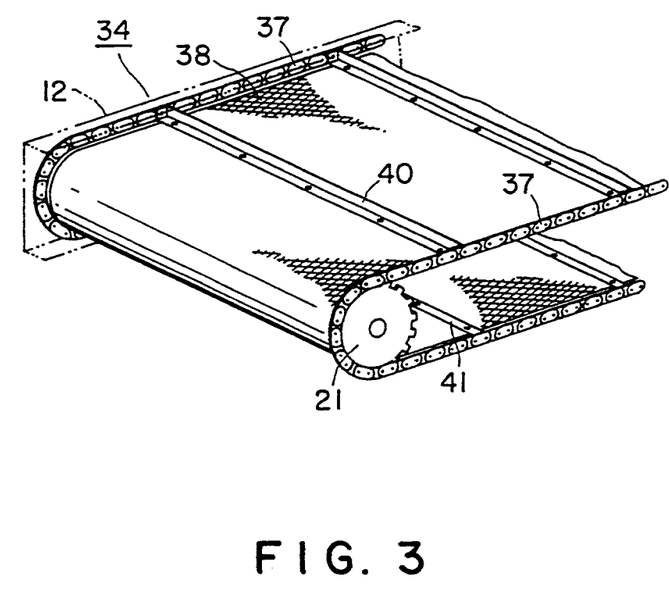
FIG. 3 is a partial view of a main conveyer element on an enlarged scale.

As shown in FIG. 3, the main conveyer element 34 is provided with a pair of bilateral chains 37, 37, a net 38 as a belt portion having a number of holes and stretched between the chains 37, 37 and sprockets 21. The net 38 is secured by angled steel members 40 disposed on the front surface side of the net 38 and flat steel members 41 disposed on the corresponding back surface side of the net 38, and these steel members 40 and 41 are secured to each other by means of rivets or the like with the net 38 being interposed therebetween. Both ends of the angled steel members 40 are secured to the chains 37, 37 so that the steel members 40 and 41 travel together with the chains 37, 37. The chains 37, 37 are engaged with five sprockets 21, only one being shown in FIG. 3, in which driving sprockets 42 are fixed to two pairs of these sprockets 21, and the driving sprockets 42 are driven by means of an electric motor 45 through intermediate sprockets 43, 43, and driving chains 44, 44, so as to cause thus the main conveyer element 34 to travel. The chains 37, 37 are covered by covers 12 provided with a bearing, not shown, for the sprocket 21.

The first conveyer element 35 has, as shown in FIG. 1, a length and width corresponding to the length and width of the crooked portion of the main conveyer element 34 which is immersed in the first treating liquid in the first treating tank 25. The first conveyer element 35 is disposed substantially parallel to the crooked portion of the main conveyer element 34 with a predetermined distance therebetween so as to prevent the frozen tuna 7 conveyed by the main conveyer element 34 from floating up from the first treating liquid in the first treating tank 25. The first conveyer element 35 is provided, like the main conveyer element 34, with a pair of bilateral chains 46, a net 47 and sprockets 48. The net 47 is clamped between flat steel plates on both side surfaces and these flat steel plates are fixed together by means of rivets, for example. Both ends of the flat steel plates are fixed to the chains 46 so as to be moved with the chains 46 upon running of the chains 46. These chains 46 are meshed with two pairs of sprockets 48, and a driving sprocket 49 is further mounted to the end of a shaft of one of the sprockets 48 disposed at a downstream end of the chain. The driving sprocket 49 is operatively connected to intermediate sprockets 43, 43, through driving chains 44, 44, which are engaged with a driving shaft of an electric motor 45, whereby when the motor 45 is driven, the intermediate sprockets 43, 43 are driven and hence the driving sprocket 49 is driven through the chains 44, 44. Then, the chains 46 are driven together with the net 47 by the rotation of the sprockets 48 which are driven by the driving sprocket 49. Covers 50 are mounted to the chains 46 and the covers 50 are mounted with bearings, not shown, of the sprockets 48.

The second conveyer element 36 has a structure substantially the same as that of the first conveyer element 35 and the same reference numerals are used to refer to the corresponding members.

The second conveyer element 36 has, as shown in FIG. 1, a length and width corresponding to the length and width of the crooked portion of the main conversion element 34 immersed in the second treating liquid in the second treating tank 26. The second conveyer element 36 is disposed substantially parallel to the crooked portion of the main conveyer element 34 with a predetermined distance therebetween so as to prevent the frozen tuna 7 conveyed by the main conveyer element 34 from floating up from the second treating liquid in the second treating tank 26. The first conveyer element 35 is provided, like the main conveyer element 34, with a pair of bilateral chains 46, a net 47 and sprockets 48. These chains 46 are meshed with two pair of sprockets 48, and a driving sprocket 49 is further mounted to the end of a shaft of one of the sprockets 48 disposed at a downstream end of the chain. The driving sprocket 49 is operably connected to intermediate sprockets 43, 43 through driving chains 44, 44, which are engaged with a driving shaft of the electric motor 45, whereby when the motor 45 is driven, the intermediate sprockets 43, 43 driven and hence the driving sprocket 49 is driven through the chains 44, 44. Then, the chains 46 are driven together with the net 47 by the rotation of the sprockets 48 which is driven by the driving sprocket 49. Covers 50 are mounted to the chains 46 with bearings, not shown, of the sprockets 48.

A frame member 52 for the conveyer unit is provided at substantially the central portion in a direction of the height of the support frame 24. The frame member 52 has a size approximately equal to that of the upper frame 28 and is adapted to suspend the covers 12, 12 of the main conveyer element 34 and the covers 50, 50 of the first and second conveyer elements 35 and 36 through support members 51, 51. As shown in FIG. 1, a motor 53 and sprockets 54, 54 are disposed above the support frame 24, and end portions of chains 55, 55, about the sprockets 54, 54, are secured to the frame member 52. According to this structure, when the motor 53 is driven, the conveyer ls lifted up from the first and second treating tanks 25 and 26 for facilitating easy cleaning thereof.

A washing shower 56 is arranged above the main conveyer element 34 on the downstream side of the first treating tank 25 and this washing shower 56 is connected to a pump 57 mounted on the support frame 24. Babbles or undesired materials floating on the surfaces of the first and second treating liquids in the first and second treating tanks 25 and 26 are removed by undesired material removing members 58, 58, which are respectively connected to a drain pipe 60, disposed below the support frame 24, through ducts 59, 59 and then the removed materials are discharged externally through a discharge port 61. In FIG. 1, reference numeral 62 denotes a control board.

The main members or portions of the support unit 2 and the treating unit 3 are formed of stainless steel or plastic members to prevent them from rusting.

The frozen meat treating apparatus 1 according to the present invention operates as follows.

The agitators 33 disposed in the second treating tank 26 are first driven and the motor 45 is also driven to run the main and first and second conveyer elements 34 and 35 and 36 through the driving chains 44, 44, the intermediate sprockets 43, 43, and the driving sprockets 42, 42. The air cylinder 16 for the driving mechanism 6 of the supply unit 2 is driven by means of a compressor, not shown.

Figure 7:
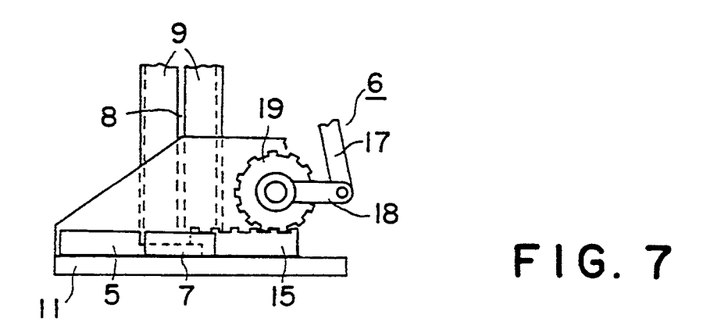
FIGS. 7 and 8 are schematic views showing a portion of the supply unit in different situations for use in explaining the operation of the supply unit.
Figure 8:
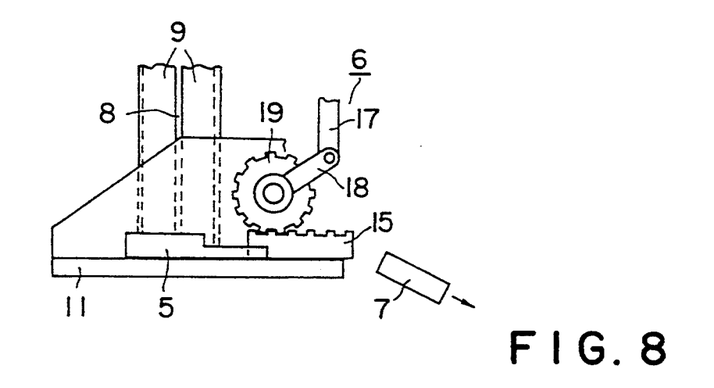

When the frozen tuna 7 is projected through the entrance port 8, the frozen tuna 7 falls down onto the frame 11, and the cam 22 is then operated in response to the running of the main conveyer 34, whereby the limit switch 23 is turned "ON". Then, air is fed to the air cylinder 16 through a change-over valve, not shown, and the piston rod 17 is retracted. The pinions 19 are rotated to thereby move the racks 15 as shown in FIGS. 7 and 8, and the supply plate 5 now abutting against the frozen tuna 7 moves forward to push out the frozen tuna 7, such that the frozen tuna 7 is moved onto the upstream side of the main conveyer element 34. At this moment, the limit switch 23 is turned "OFF" and the change-over valve is changed over to feed the air to the air cylinder 16 to expand the piston rod 17. Accordingly, the pinions 19 are again rotated and the racks 15 are moved to move the supply plate 5 to the position shown in FIG. 8. The frozen tuna 7 supplied through the entrance port 8 are moved onto the main conveyer element 34 subsequently by repeating the above mentioned operation.

Thereafter, the frozen tuna 7 is conveyed on the main conveyer element 34 between the main conveyer element 34 and the first conveyer element 35, by being pushed by the angled steel members 40 of the main conveyer element 34, while being immersed in the first treating liquid in the first treating tank 25. While passing through the first treating liquid in the first treating tank 25, the frozen tuna 7 is subjected to a thawing treatment to primarily remove the undesired materials adhering to the surface of the frozen tuna 7.

Next, the tuna 7 passing through the first treating tank 25 is washed by the washing shower 56 to remove the remaining undesired materials adhering to the surface of the tuna 7. The frozen tuna 7 is then moved into the second treating tank 26 by being pushed by the angled steel members 40 of the main conveyer element 34, and is immersed in the second treating liquid in the second treating tank 26. The second treating liquid is agitated by the agitators 33 disposed in the second treating tank 26. While passing through the second treating tank 26, the undesired materials still remaining on the surface of the frozen tuna 7 are removed and at the same time the frozen tuna 7 is subjected to a pH regulating treatment to thereby uniformly maintain the quality of the frozen tuna 7. The frozen tuna 7 passing through the main conveyer element 34 and the second conveyer element 36 is then conveyed downstream by the main conveyer element 34 for the next treatment liquid.

Further, the agitation in the second treating tank 26 aims to uniformly distribute the pH regulator in the second treating tank to obtain a predetermined pH regulated alkaline treating.

When it is required to clean the first and second treating tanks 25 and 26 or to inspect the conveyer unit 10, the motor 53 is driven to lift up the chains 55, 55 through the operation of the sprockets 54, 54, thereby lifting up the conveyer unit 10 together with the frame member 52, to thereby allow for easily and effectively cleaning the treating tanks 25 and 26 and inspecting the conveyer unit 10.

It is to be noted that the present invention is not limited to the described embodiment and many other changes or modifications may be made within the scope of the appended claims. For example, the number of the treating liquid tanks may be increased as occasion demands. The structure of the frozen meat accommodation portion may be changed in accordance with the kinds of frozen meat to be treated.

What is claimed is:

1. A method of treating frozen meat comprising the steps of:
   placing the frozen meat from a supply unit onto a conveyer provided with a belt member having a number of holes;
   conveying the frozen meat to a first treating tank in which a first treating liquid is stored;
   immersing the frozen meat during the conveying thereof into the first treating liquid to thaw and wash a surface of the frozen meat;
   conveying the frozen meat to a second treating tank which is disposed downstream of the first treating tank and in which a second treating liquid is stored;
   immersing the frozen meat during the conveying thereof into the second treating liquid to subject the frozen meat to a quality maintaining treatment; and
   conveying the frozen meat thus treated downstream of the second treating tank, wherein the first treating liquid is salt water and the second treating liquid is a pH regulation alkaline liquid.

2. The method according to claim 1, further comprising agitating said second treating liquid.

3. The method according to claim 1, further comprising the step of washing the frozen meat after passing it through the first treating tank.

4. The method according to claim 1, wherein, in said steps of immersing the frozen meat into the first and second treating liquids, predetermined lengths of said conveyer are immersed in the first and second treating liquids.

* * * * *